US007140438B2

(12) United States Patent
Frost et al.

(10) Patent No.: US 7,140,438 B2
(45) Date of Patent: *Nov. 28, 2006

(54) ORTHOESTER COMPOSITIONS AND METHODS OF USE IN SUBTERRANEAN APPLICATIONS

(75) Inventors: Keith A. Frost, Duncan, OK (US); Gary P. Funkhouser, Duncan, OK (US); Bessie "Nita" Q. Citrowske, Duncan, OK (US); Brad L. Todd, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 63 days.

This patent is subject to a terminal disclaimer.

(21) Appl. No.: 10/752,752

(22) Filed: Jan. 7, 2004

(65) Prior Publication Data

US 2005/0034868 A1 Feb. 17, 2005

Related U.S. Application Data

(63) Continuation-in-part of application No. 10/641,242, filed on Aug. 14, 2003, now Pat. No. 7,080,688, and a continuation-in-part of application No. 10/650,101, filed on Aug. 26, 2003.

(51) Int. Cl.
*E21B 37/00* (2006.01)
*E21B 43/04* (2006.01)
*E21B 43/267* (2006.01)
*E21B 43/27* (2006.01)

(52) U.S. Cl. .................. 166/278; 166/280.2; 166/300; 166/307; 166/312; 507/260; 507/267; 507/277; 507/906; 507/924; 428/403; 428/404; 428/406

(58) Field of Classification Search ................ 166/311, 166/312, 307, 291, 300, 280.2, 270, 278; 507/260, 261, 266, 267, 277, 906, 924; 428/403, 428/404, 406
See application file for complete search history.

(56) References Cited

U.S. PATENT DOCUMENTS

| | | | |
|---|---|---|---|
| 2,238,671 A | 4/1941 | Woodhouse | 166/21 |
| 2,703,316 A | 3/1955 | Palmer | 260/78.3 |
| 3,015,680 A * | 1/1962 | Isler et al. | 585/253 |
| 3,173,484 A | 3/1965 | Huitt et al. | 166/280.1 |
| 3,195,635 A | 7/1965 | Fast | 166/280.1 |
| 3,272,650 A | 9/1966 | MacVittie | 134/7 |
| 3,302,719 A | 2/1967 | Fischer | 166/280.2 |
| 3,364,995 A | 1/1968 | Atkins et al. | 166/280.1 |
| 3,366,178 A | 1/1968 | Malone et al. | 166/280.1 |
| 3,455,390 A | 7/1969 | Gallus | 166/295 |
| 3,658,832 A * | 4/1972 | Asato et al. | 548/131 |
| 3,784,585 A | 1/1974 | Schmitt et al. | 260/861 |
| 3,819,525 A | 6/1974 | Hattenbrun | 252/132 |
| 3,828,854 A | 8/1974 | Templeton et al. | 166/307 |
| 3,868,998 A | 3/1975 | Lybarger et al. | 166/278 |
| 3,912,692 A | 10/1975 | Casey et al. | 260/78.3 |
| 3,948,672 A | 4/1976 | Harnsberger | 106/90 |
| 3,955,993 A | 5/1976 | Curtice | 106/90 |
| 3,960,736 A | 6/1976 | Free et al. | 252/8.55 R |
| 3,968,840 A | 7/1976 | Tate | 166/280.1 |
| 3,998,272 A | 12/1976 | Maly | 166/281 |
| 3,998,744 A | 12/1976 | Arnold et al. | 507/269 |
| 4,068,718 A | 1/1978 | Cooke, Jr. et al. | 166/280.2 |
| 4,169,798 A | 10/1979 | DeMartino | 252/8.55 R |
| 4,172,066 A | 10/1979 | Zweigle et al. | 260/29.6 TA |
| 4,261,421 A | 4/1981 | Watanabe | 166/281 |
| 4,387,769 A | 6/1983 | Erbstoesser et al. | 166/295 |
| 4,460,052 A | 7/1984 | Gockel | 175/72 |
| 4,470,915 A | 9/1984 | Conway | 252/8.55 R |
| 4,498,995 A | 2/1985 | Gockel | 252/8.5 LC |
| 4,526,695 A | 7/1985 | Erbstoesser et al. | 252/8.55 R |
| 4,694,905 A | 9/1987 | Armbruster | 166/280 |
| 4,715,967 A | 12/1987 | Bellis | 252/8.551 |
| 4,716,964 A | 1/1988 | Erbstoesser et al. | 166/284 |
| 4,785,884 A | 11/1988 | Armbruster | 166/280 |
| 4,797,262 A | 1/1989 | Dewitz | 422/142 |
| 4,809,783 A | 3/1989 | Hollenbeck et al. | 166/307 |
| 4,817,721 A | 4/1989 | Pober | 166/295 |
| 4,843,118 A | 6/1989 | Lai et al. | 524/555 |
| 4,848,467 A | 7/1989 | Cantu et al. | 166/281 |
| 4,886,354 A | 12/1989 | Welch et al. | 356/70 |
| 4,957,165 A | 9/1990 | Cantu et al. | 166/295 |
| 4,961,466 A | 10/1990 | Himes et al. | 166/250 |
| 4,986,353 A | 1/1991 | Clark et al. | 166/279 |
| 4,986,354 A | 1/1991 | Cantu et al. | 166/279 |

(Continued)

FOREIGN PATENT DOCUMENTS

EP  0 510 762 A2  4/1992

(Continued)

OTHER PUBLICATIONS

Morrison, Robert Thornton, et al, Organic Chemistry, Sixth Edition, 1992, pp. 242, 243.*

(Continued)

*Primary Examiner*—George Suchfield
(74) *Attorney, Agent, or Firm*—Robert A. Kent; Baker Botts

(57) ABSTRACT

The present invention relates to methods and compositions for treating subterranean formations, and more specifically, to improved methods and compositions for generating acids for use downhole, for example, to at least partially degrade the acid-soluble portions of filter cakes deposited in subterranean formations. In one embodiment, the present invention provides a method of degrading an acid-soluble portion of a filter cake comprising contacting the acid-soluble portion of the filter cake with an acid generated from an orthoester.

50 Claims, No Drawings

U.S. PATENT DOCUMENTS

| | | | |
|---|---|---|---|
| 4,986,355 A | 1/1991 | Casad et al. | 166/295 |
| 5,082,056 A | 1/1992 | Tackett, Jr. | 166/295 |
| 5,211,234 A * | 5/1993 | Floyd | 166/276 |
| 5,216,050 A | 6/1993 | Sinclair | 524/108 |
| 5,247,059 A | 9/1993 | Gruber et al. | 528/354 |
| 5,249,628 A | 10/1993 | Surjaatmadja | 166/305 |
| 5,295,542 A | 3/1994 | Cole et al. | 166/278 |
| 5,325,923 A | 7/1994 | Surjaatmadja et al. | 166/308 |
| 5,330,005 A | 7/1994 | Card et al. | 166/280 |
| 5,359,026 A | 10/1994 | Gruber | 528/354 |
| 5,360,068 A | 11/1994 | Sprunt et al. | 166/259 |
| 5,363,916 A | 11/1994 | Himes et al. | 166/276 |
| 5,373,901 A | 12/1994 | Norman et al. | 166/300 |
| 5,386,874 A | 2/1995 | Laramay et al. | 166/300 |
| 5,396,957 A | 3/1995 | Surjaatmadja et al. | 166/308 |
| 5,402,846 A | 4/1995 | Jennings, Jr. et al. | 166/259 |
| 5,439,055 A | 8/1995 | Card et al. | 166/280 |
| 5,460,226 A | 10/1995 | Lawson et al. | 166/300 |
| 5,464,060 A | 11/1995 | Hale et al. | 166/293 |
| 5,475,080 A | 12/1995 | Gruber et al. | 528/354 |
| 5,484,881 A | 1/1996 | Gruber et al. | 528/354 |
| 5,497,830 A | 3/1996 | Boles et al. | 166/300 |
| 5,499,678 A | 3/1996 | Surjaatmadja et al. | 166/298 |
| 5,504,235 A * | 4/1996 | Hirose et al. | 556/467 |
| 5,505,787 A | 4/1996 | Yamaguchi | 134/4 |
| 5,512,071 A | 4/1996 | Yam et al. | 51/307 |
| 5,536,807 A | 7/1996 | Gruber et al. | 528/354 |
| 5,591,700 A | 1/1997 | Harris et al. | 507/204 |
| 5,594,095 A | 1/1997 | Gruber et al. | 528/354 |
| 5,604,186 A | 2/1997 | Hunt et al. | 507/204 |
| 5,607,905 A | 3/1997 | Dobson, Jr. et al. | |
| 5,670,473 A | 9/1997 | Scepanski | 510/445 |
| 5,698,322 A | 12/1997 | Tsai et al. | 428/373 |
| 5,765,642 A | 6/1998 | Surjaatmadja | 166/297 |
| 5,791,415 A | 8/1998 | Nguyen et al. | 166/280 |
| 5,833,000 A | 11/1998 | Weaver et al. | 166/276 |
| 5,849,401 A | 12/1998 | El-Afandi et al. | 428/215 |
| 5,853,048 A | 12/1998 | Weaver et al. | 166/279 |
| 5,893,416 A | 4/1999 | Read | 166/304 |
| 5,908,073 A | 6/1999 | Nguyen et al. | 166/276 |
| 5,909,774 A * | 6/1999 | Griffith et al. | 166/312 |
| 5,924,488 A | 7/1999 | Nguyen et al. | 166/280 |
| 5,964,291 A | 10/1999 | Bourne et al. | 166/279 |
| 6,004,400 A | 12/1999 | Bishop et al. | 134/2 |
| 6,024,170 A | 2/2000 | McCabe et al. | 166/300 |
| 6,028,113 A | 2/2000 | Scepanski | 514/643 |
| 6,047,772 A | 4/2000 | Weaver et al. | 166/276 |
| 6,114,410 A | 9/2000 | Betzold | 523/130 |
| 6,123,965 A | 9/2000 | Jacob et al. | 424/489 |
| 6,131,661 A | 10/2000 | Conner et al. | |
| 6,135,987 A | 10/2000 | Tsai et al. | 604/365 |
| 6,143,698 A | 11/2000 | Murphey et al. | |
| 6,162,766 A | 12/2000 | Muir et al. | 507/267 |
| 6,169,058 B1 | 1/2001 | Le et al. | 507/222 |
| 6,172,011 B1 | 1/2001 | Card et al. | 507/204 |
| 6,189,615 B1 | 2/2001 | Sydansk | 166/270 |
| 6,202,751 B1 | 3/2001 | Chatterji et al. | 166/276 |
| 6,209,643 B1 | 4/2001 | Nguyen et al. | 166/276 |
| 6,209,646 B1 | 4/2001 | Reddy et al. | 166/300 |
| 6,214,773 B1 | 4/2001 | Harris et al. | 507/271 |
| 6,242,390 B1 | 6/2001 | Mitchell et al. | 507/211 |
| 6,260,622 B1 | 7/2001 | Blok et al. | 166/305.1 |
| 6,311,773 B1 | 11/2001 | Todd et al. | 166/280 |
| 6,323,307 B1 | 11/2001 | Bigg et al. | 528/354 |
| 6,326,458 B1 | 12/2001 | Gruber et al. | 528/354 |
| 6,328,105 B1 | 12/2001 | Betzold | 166/280 |
| 6,357,527 B1 | 3/2002 | Norman et al. | 166/300 |
| 6,364,945 B1 | 4/2002 | Chatterji et al. | 106/677 |
| 6,380,138 B1 | 4/2002 | Ischy et al. | 507/204 |
| 6,387,986 B1 | 5/2002 | Moradi-Araghi et al. | 523/211 |
| 6,390,195 B1 | 5/2002 | Nguyen et al. | 166/276 |
| 6,394,185 B1 | 5/2002 | Constien | |
| 6,422,314 B1 | 7/2002 | Todd et al. | 166/312 |
| 6,454,003 B1 | 9/2002 | Chang et al. | 166/270 |
| 6,485,947 B1 | 11/2002 | Rajgarhia et al. | 435/139 |
| 6,488,763 B1 | 12/2002 | Brothers et al. | 106/692 |
| 6,494,263 B1 | 12/2002 | Todd | 166/312 |
| 6,508,305 B1 | 1/2003 | Brannon et al. | 166/293 |
| 6,527,051 B1 | 3/2003 | Reddy et al. | 166/300 |
| 6,554,071 B1 | 4/2003 | Reddy et al. | 166/293 |
| 6,569,814 B1 | 5/2003 | Brady et al. | 507/201 |
| 6,599,863 B1 | 7/2003 | Palmer et al. | 507/219 |
| 6,667,279 B1 | 12/2003 | Hessert et al. | 507/225 |
| 6,669,771 B1 | 12/2003 | Tokiwa et al. | 106/162 |
| 6,681,856 B1 | 1/2004 | Chatterji et al. | 166/294 |
| 6,686,328 B1 | 2/2004 | Binder | 510/446 |
| 6,702,023 B1 | 3/2004 | Harris et al. | 166/307 |
| 6,710,019 B1 | 3/2004 | Sawdon et al. | 507/136 |
| 6,761,218 B1 | 7/2004 | Nguyen et al. | |
| 6,763,888 B1 | 7/2004 | Harris et al. | 166/305.1 |
| 6,817,414 B1 | 11/2004 | Lee | 166/278 |
| 6,896,058 B1 | 5/2005 | Munoz, Jr. et al. | 166/279 |
| 6,949,491 B1 | 9/2005 | Cooke, Jr. | 507/219 |
| 2001/0016562 A1 | 8/2001 | Muir et al. | 507/201 |
| 2002/0036088 A1 | 3/2002 | Todd | |
| 2002/0125012 A1* | 9/2002 | Dawson et al. | 166/300 |
| 2003/0060374 A1 | 3/2003 | Cooke, Jr. | 507/200 |
| 2003/0114314 A1 | 6/2003 | Ballard et al. | 507/100 |
| 2003/0130133 A1 | 7/2003 | Vallmer | 507/100 |
| 2003/0188766 A1 | 10/2003 | Banerjee et al. | 134/7 |
| 2003/0234103 A1 | 12/2003 | Lee et al. | 166/293 |
| 2004/0014607 A1 | 1/2004 | Sinclair et al. | 507/200 |
| 2004/0040706 A1 | 3/2004 | Hossaini et al. | 166/278 |
| 2004/0055747 A1 | 3/2004 | Lee | 166/278 |
| 2004/0094300 A1 | 5/2004 | Sullivan et al. | 166/308.1 |
| 2004/0106525 A1 | 6/2004 | Willbert et al. | 507/200 |
| 2004/0138068 A1 | 7/2004 | Rimmer et al. | 507/100 |
| 2004/0152601 A1 | 8/2004 | Still et al. | 507/100 |
| 2004/0152602 A1 | 8/2004 | Boles | 507/100 |
| 2004/0216876 A1 | 11/2004 | Lee | 166/280.1 |
| 2004/0231845 A1 | 11/2004 | Cooke, Jr. | 166/279 |
| 2004/0261993 A1 | 12/2004 | Nguyen | 166/276 |
| 2004/0261995 A1 | 12/2004 | Nguyen et al. | 166/279 |
| 2004/0261996 A1 | 12/2004 | Munoz, Jr. et al. | 166/279 |
| 2004/0261999 A1 | 12/2004 | Nguyen | 166/292 |
| 2005/0006095 A1 | 1/2005 | Justus et al. | |
| 2005/0028976 A1 | 2/2005 | Nguyen | 166/276 |
| 2005/0034861 A1 | 2/2005 | Saini et al. | 166/278 |
| 2005/0034865 A1 | 2/2005 | Todd et al. | 166/304 |
| 2005/0103496 A1 | 5/2005 | Todd et al. | 166/278 |
| 2005/0126785 A1* | 6/2005 | Todd | 166/307 |
| 2005/0252659 A1 | 11/2005 | Sullivan et al. | 166/280.1 |
| 2005/0272613 A1 | 12/2005 | Cooke, Jr. | 507/219 |

FOREIGN PATENT DOCUMENTS

| | | |
|---|---|---|
| EP | 0 879 935 A2 | 11/1998 |
| EP | 0 879 935 A3 | 10/1999 |
| EP | 1 413 710 A1 | 4/2004 |
| US | WO 04/037946 A1 | 5/2004 |
| US | WO 04/038176 A1 | 5/2004 |
| WO | WO 93/15127 | 8/1993 |
| WO | WO 94/07949 | 4/1994 |
| WO | WO 94/08078 | 4/1994 |
| WO | WO 94/08090 | 4/1994 |
| WO | WO 95/09879 | 4/1995 |
| WO | WO 97/11845 | 4/1997 |
| WO | WO 99/27229 | 6/1999 |
| WO | WO 2000/57022 | 9/2000 |
| WO | WO2001/02698 | 1/2001 |
| WO | WO 01/87797 A1 | 11/2001 |
| WO | WO 02/12674 A1 | 2/2002 |
| WO | WO 03/027431 A2 | 4/2003 |
| WO | WO 03/027431 A3 | 4/2003 |

WO WO 2004/007905 1/2004

OTHER PUBLICATIONS

U.S. Appl. No. 10/650,101, filed Aug. 26, 2003, Todd et al.
U.S. Appl. No. 10/655,883, filed Sep. 5, 2003, Nguyen.
U.S. Appl. No. 10/661,173, filed Sep. 11, 2003, Todd et al.
U.S. Appl. No. 10/664,126, filed Sep. 17, 2003, Todd et al.
U.S, Appl. No. 10/736,152, filed Dec. 15, 2003, Todd.
Love, et al, *Selectively Placing Many Fractures in Openhole Horizontal Wells Improves Production*, SPE 50422, Society of Petroleum Engineers, 1998.
McDaniel, et al, *Evolving New Stimulation Process Proves Highly Effective in Level 1 Dual-Lateral Completion*, SPE 78697, Society of Petroleum Engineers, 2002.
Albertsson, et al, *Aliphatic Polyesters: Synthesis, Properties and Applications*, Advances in Polymer Science, vol. 157, 2002.
Dechy-Cabaret, et al, *Controlled Ring-Opening Polymerization of Lactide and Glycolide*, American Chemical Society, Chemical Reviews, A-Z, AA-AD, received 2004.
Funkhouser, et al, *Synthetic Polymer Fracturing Fluid for High-Temperature Applications*, SPE 80236, Society of Petroleum Engineers, 2003.
*Chelating Agents*, Encyclopedia of Chemical Technology, vol. 5 (764-795), undated.
Vichaibun, et al, *A New Assay for the Enzymatic Degradation of Polylactic Acid, Short Report*, ScienceAsia, vol. 29, 2003 (pp. 297-300).
Halliburton, *SurgiFrac$^{SM}$ Service, A Quick and Cost-Effective Method to Help Boost Production From Openhole Horizontal Completions*, Halliburton Communications, HO3297, 2002.
Halliburton, *Cobra Frac$^{SM}$ Service, Coiled Tubing Fracturing—Cost-Effective Method for Stimulating Untapped Reserves*, HO2319R, Halliburton Energy Services, 2000.
Halliburton, *CobraJet Frac$^{SM}$ Service, Cost-effective Technology That Can Help Reduce Cost Per BOE Produced, Shorten Cycle Time and Reduce Capex*, Halliburton Communications, undated.
Blauch, et al, *Aqueous Tackifier and Methods of Controlling Particulates*, U.S. Appl. No. 10/864,061, filed Jun. 9, 2004.
Blauch, et al, *Aqueous-Based Tackifier Fluids and Methods of Use*, U.S. Appl. No. 10/864,618, filed Jun. 9, 2004.
Y. Chiang et al.: "Hydrolysis Of Ortho Esters: Further Investigation Of The Factors Which Control The Rate-Determing Step" Engineering Information Inc., NY, NY, vol. 105, No. 23 (XP-002322842), undated, Nov. 16, 1983.
M. Ahmad, et al.: Ortho Ester Hydroylsis: Direct Evidence For A Three-Stage Reaction Mechanism Engineering Information Inc., NY, NY, vol. 101, No. 10 (XP-002322843), undated, May 9, 1979.
Cantu, et al., "Laboratory and Field Evaluation of a Combined Fluid-Loss-Control Additive and Gel Breaker for Fracturing Fluids," SPE Paper 18211, (1990).
Simmons, et al., "Poly(phenyllactide): Synthesis, Characterization, and Hydrolytic Degradation," Biomacromolecules, vol. 2, No. 3, 2001 (pp. 658-663).

Yin, et al., "Preparation and Characterization of Substituted Polylactides," Am. Chem. Soc., vol. 32, No. 23, 1999 (pp. 7711-7718).
Yin, et al., "Synthesis and Properties of Polymers Derived form Substituted Lactic Acids," Am. Chem. Soc., Ch. 12, 2001 (pp. 147-159).
Skrabal et al., *The Hydrolysis Rate Of Orthoformic Acid Ethyl Ether*, Chemical Institute of The University of Graz, pp. 1-38, Jan. 13, 1921.
Heller, et al., *Poly(ortho esters)—From Concept To Reality*, Biomacromolecules, vol. 5, No. 5, 2004 (pp. 1625-1632), May 9, 1979.
Schwach-Abdellaoui, et al., *Hydrolysis and Erosion Studies of Autocatalyzed Poly(ortho esters) Containing Lactoyl-Lactyl Acid Dimers*, American Chemical Society, vol. 32, No. 2, 1999 (pp. 301-307).
Ng, et al., *Synthesis and Erosion Studies of Self-Catalyzed Poly(ortho ester)s*, American Chemical Society, vol. 30, No. 4, 1997 (pp. 770-772).
Ng, et al., *Development Of A Poly(ortho ester) prototype With A Latent Acid In The Polymer Backbone For 5-fluorouracil Delivery*, Journal of Controlled Release 65 (2000), (pp. 367-374).
Rothen-Weinhold, et al., Release of BSA from poly(ortho ester) extruded thin strands, *Journal of Controlled Release* 71, 2001, (pp. 31-37).
Heller, et al., *Poly(ortho ester)s—their development and some recent applications*, European Journal of Pharmaceutics and Biopharmaceutics, 50, 2000, (pp. 121-128).
Heller, et al., *Poly(ortho ester); synthesis, characterization, properties and uses*, Advanced Drug Delivery Reviews, 54, 2002, (pp. 1015-1039).
Heller, et al., *Poly(ortho esters) For The Pulsed And Continuous Delivery of Peptides And Proteins*, Controlled Release and Biomedical Polymers Department, SRI International, (pp. 39-46), undated.
Zignani, et al., *Subconjunctival biocompatibility of a viscous bioerodable poly(ortho ester)*, J. Biomed Mater Res, 39, 1998, pp. 277-285.
Toncheva, et al., *Use of Block Copolymers of Poly(Ortho Esters) and Poly (Ethylene Glycol)*, Journal of Drug Targeting, 2003, vol. 11(6), pp. 345-353.
Schwach-Abdellaoui, et al., *Control of Molecular Weight For Auto-Catalyzed Poly(ortho ester) Obtained by Polycondensation Reaction*, International Journal of Polymer Anal. Charact., 7: 145-161, 2002, pp. 145-161.
Heller, et al., *Release of Norethindrone from Poly(Ortho Esters)*, Polymer Engineering and Science, Mid-Aug. 1981, vol. 21, No. 11 (pp. 727-731).

* cited by examiner

ORTHOESTER COMPOSITIONS AND METHODS OF USE IN SUBTERRANEAN APPLICATIONS

CROSS-REFERENCE TO RELATED APPLICATIONS

This application is a continuation-in-part of application Ser. No. 10/641,242, entitled Compositions and Methods for Degrading Filter Cake, filed on Aug. 14, 1003, and application Ser. No. 10/650,101, entitled Compositions and Methods for Reducing the Viscosity of a Fluid, filed on Aug. 26, 2003.

BACKGROUND OF THE INVENTION

The present invention relates to methods and compositions for treating subterranean formations, and more specifically, to improved methods and compositions for generating acids for use downhole, for example, to at least partially degrade the acid-soluble portions of filter cakes deposited in subterranean formations.

Filter cakes, e.g., residues deposited on permeable media when servicing fluids contact those media under pressure, are formed in a variety of subterranean operations such as drilling, fracturing, and gravel packing. A filter cake is often desirable, at least temporarily, as it may prevent a fluid from flowing from a desired location to the surrounding subterranean formation. Moreover, the presence of a filter cake may add strength and stability to the formation surfaces on which the filter cake forms.

Filter cakes can form in many subterranean processes. For example, a drill-in fluid in an open hole can form a filter cake. Such filter cakes generally comprise an acid-soluble portion and a polymeric portion. Filter cakes also may be formed during a fracturing operation. As a fracture is created, a portion of the fluid contained in the viscous fracturing fluid may create a filter cake comprising deposited viscosifier and/or fluid loss control additives, inter alia, on the walls of the fracture and/or the formation.

No matter which process forms a filter cake, the filter cake generally acts as a physical barrier to fluid flow that may reduce fluid loss into the producing zone. The filter cake also presents a barrier to flow of liquid from the zone; thus, at some point before the well is put into production, the filter cake generally is removed so that the formation may be placed on production.

While filter cakes may be beneficial, it is generally necessary to remove filter cakes from producing zones once the well is placed into production. For example, to degrade the acid-soluble portion of a drill-in fluid filter cake, a conventional delayed-release acid system usually may be used. A common type of delayed-release acid system comprises esters that slowly hydrolyze to form acids that may ultimately degrade the acid-soluble portion of the filter cake. These delayed-release acid systems, however, can be problematic if they degrade the acid-soluble component of the filter cake too slowly or too quickly. Removal of only 1% to 2% of the bridging solids in the filter cake can result in a significant loss of fluid to the surrounding formation. If a delayed-release acid system is designed not to dissolve more than 1% or 2% of the acid-soluble portion of the filter cake in a chosen period of time (e.g., a 12-hour period), then total removal may take days, if not weeks. This is undesirable. On the other hand, if a delayed-release acid system is designed to totally degrade the acid-soluble portion within an acceptable "total cleanup time" (e.g., 24 to 48 hours), it is likely to cause hole instability and potential fluid loss problems during gravel pack placement. To control such fast-acting delayed-release acid systems, buffers (which are mixtures of weak acids and their conjugate bases) may be considered to achieve a delayed interaction of the acid with the acid-soluble portion of the filter cake for a desired time period. However, such conventional buffer systems have met with little success when used with these delayed-release acid systems, inter alia, because the esters may undergo acid- or base-catalyzed hydrolysis at pHs much below or above 7. Also, conventional buffers may suffer when exposed to components, such as calcium carbonate, in the filter cake and, as a result, the acid component of the buffer may be quickly consumed.

SUMMARY OF THE INVENTION

The present invention relates to methods and compositions for treating subterranean formations, and more specifically, to improved methods and compositions for generating acids for use downhole, for example, to at least partially degrade the acid-soluble portions of filter cakes deposited in subterranean formations.

In one embodiment, the present invention provides a method of degrading an acid-soluble portion of a filter cake comprising contacting the acid-soluble portion of the filter cake with an acid generated from an orthoester.

In another embodiment, the present invention provides a method of generating an acid in a subterranean formation comprising the steps of: providing an orthoester composition that comprises an orthoester; placing the orthoester composition in the formation; and allowing the orthoester to generate an acid in the formation.

In another embodiment, the present invention provides a method of degrading an acid-soluble component in a subterranean formation comprising the steps of: providing an orthoester composition that comprises an orthoester; placing the orthoester composition in the formation; allowing the orthoester to generate a generated acid; and allowing the generated acid to at least partially degrade the acid soluble component.

In another embodiment, the present invention provides a method of degrading a filter cake in a subterranean formation comprising the steps of: providing particulates coated or impregnated with an orthoester composition that comprises an orthoester; placing the particulates into the subterranean formation so that they are substantially adjacent to the filter cake; allowing the orthoester to generate a generated acid; and allowing the generated acid to degrade at least a portion of an acid-soluble portion of the filter cake.

In another embodiment, the present invention provides a composition capable of degrading an acid soluble component in a subterranean formation comprising an orthoester that will generate an acid that is capable of degrading at least a portion of the acid soluble component.

The features and advantages of the present invention will be readily apparent to those skilled in the art upon a reading of the description of the preferred embodiments, which follows.

DESCRIPTION OF PREFERRED EMBODIMENTS

The present invention relates to methods and compositions for treating subterranean formations, and more specifically, to improved methods and compositions for generating acids for use downhole, for example, to at least partially degrade the acid-soluble portions of filter cakes deposited in subterranean formations. One of the desirable features of the compositions and methods of the present invention is that they provide for the delayed release of an acid. The compositions and methods of the present invention are suitable for any application wherein it is desirable to generate an acid downhole that may be useful. Another instance where these compositions and methods may be useful is for reducing the viscosity of a viscosified treatment fluid.

In certain embodiments wherein the compositions and methods of the present invention are used to degrade a filter cake, one of the many benefits offered by the present invention includes the fact that the well does not need to be shut-in for long periods of time to accomplish a substantial, beneficial degradation of the filter cake so as to be able to put the well into production. With the compositions and methods of the present invention, a desirable degradation of a filter cake can be obtained in a highly desirable period of time.

The orthoester compositions of the present invention comprise orthoesters. These orthoesters will generate acids that will degrade the acid-soluble portion of a filter cake. Examples of suitable orthoesters have a structure defined by the formula: RC(OR')(OR'')(OR'''), wherein R', R'', and R''' are not hydrogen, and R', R'', and R''' may or may not be the same group. R', R'', or R''' may comprise a heteroatom that may affect the solubility of the chosen orthoester in a given application. Suitable heteroatoms could include nitrogen or oxygen. Examples of suitable orthoesters and poly(orthoesters) include, but are not limited to, orthoacetates, such as trimethyl orthoacetate, triethyl orthoacetate, tripropyl orthoacetate, triisopropyl orthoacetate, and poly(orthoacetates); orthoformates, such as trimethyl orthoformate, triethyl orthoformate, tripropyl orthoformate, triisopropyl orthoformate, and poly(orthoformates); and orthopropionates, such as trimethyl orthopropionate, triethyl orthopropionate, tripropyl orthopropionate, triisopropyl orthopropionate, and poly(orthopropionates). Suitable orthoesters also may be orthoesters of polyfunctional alcohols, such as glycerin and/or ethylene glycol. Those skilled in the art with the benefit of this disclosure will recognize suitable orthoesters that may be used in a desired application. In choosing an orthoester, one should be mindful that some orthoesters have low flash points. Therefore, the choice of which particular orthoester to use should be guided by such considerations as environmental factors. The orthoester may comprise less than about 1% to about 100% of the orthoester composition.

To allow the orthoester to hydrolyze to produce an acid, a source of water is needed. The water should be present in an amount from about 2 moles of water for about every 1 mole of orthoester to an excess of water, which may help ensure the solubility of the reaction product of the reaction between the generated acid and the acid-soluble component, e.g., solubility with the acid-soluble portion of a filter cake. One of ordinary skill in the art with the benefit of this disclosure will recognize whether a suitable amount of water is present in either the orthoester composition or in the well bore for a desired application.

The orthoester compositions of the present invention also may comprise an inhibitor, which may delay the generation of the acid from the orthoester of the orthoester composition and also may neutralize the generated acid during the delay period. Suitable inhibitors include bases. Examples of some preferred inhibitors may include sodium hydroxide, potassium hydroxide, amines such as hexamethylenetetramine, sodium carbonate, and combinations thereof. In certain embodiments, a small amount of a strong base as opposed to a large amount of a relatively weak base is preferred to achieve the delayed generation of the acid and the neutralization of the generated acid for a desired delay period.

The orthoester compositions of the present invention can have any suitable form. For instance, these compositions can be used in a solution form, a gel form, or an emulsion form. In certain applications, a solution form may be useful, e.g., when a faster break of a treatment fluid or a faster degradation of a filter cake, is desired; in other applications, e.g., when a slower break or degradation is desirable, a gel or emulsion form may be used. For the solution form, suitable exemplary solvents include propylene glycol, propylene glycol monomethyl ether, dipropylene glycol monomethyl ether, and ethylene glycol monobutyl ether. In some embodiments, mixtures of solvents and water may be beneficial, for example, to keep the orthoester solubilized. The gel form of the orthoester composition may be gelled with suitable polymers and/or surfactants. For the emulsion form, suitable emulsifiers include emulsifiers like "WS-44," which is commercially available from Halliburton Energy Services, Duncan, Okla.

In some embodiments of the present invention wherein an orthoester composition of the present invention is used to degrade a filter cake, if desired, chemical components that can degrade a polymeric portion of a filter cake may be used in conjunction with an orthoester composition of the present invention. Suitable examples include compatible oxidizers and/or enzymes that are capable of degrading the polymeric components of the filter cake. These oxidizers or enzymes may be in any suitable form, for example, encapsulated or otherwise contained to create a beneficial release of the oxidizer or enzyme.

In alternative embodiments of the methods of the present invention, an orthoester composition of the present invention may be coated or impregnated onto a particulate that will be placed downhole in a subterranean treatment such as fracturing or gravel packing. When the orthoester ultimately hydrolyzes and generates the acid, the acid may degrade the acid-soluble portion of a filter cake, e.g., at least that portion substantially adjacent to the coated particulates. The generated acid also may act as a breaker for a viscosified treatment fluid, such as a fracturing or gravel pack fluid.

Any particulate suitable for use in conjunction with subterranean applications is suitable for use as particulates in these embodiments of the methods of the present invention. For instance, natural sand, quartz sand, particulate garnet, glass, ground walnut hulls, polymeric pellets, bauxite, ceramics, or the like are all suitable. Suitable sizes range from about 4 to about 100 U.S. mesh, in certain preferred embodiments, the sizes may range from about 10 to about 70 U.S. mesh.

The orthoester compositions of the present invention may be coated onto a particulate material by any means known in the art. For instance, in one embodiment, the particulates may be coated with an orthoester composition "on-the-fly." The term "on-the-fly" is used herein to refer to an instance where one flowing stream is continuously introduced into another flowing stream so that the streams are combined and mixed while continuing to flow as a single stream as part of an ongoing treatment. Such mixing can also be described as "real-time" mixing. Batch or partial batch mixing processes may also be suitable. The coated particulate as described herein may be used as gravel particles in sand control operations, as proppant particles in fracturing operations, or as any other particulate employed in subterranean operations that may be placed substantially adjacent to a filter cake comprising an acid-soluble component.

Where the orthoester composition is a relatively solid material at ambient temperatures, it may be advantageous to mix the orthoester composition with a solvent to facilitate the coating of the orthoester composition onto the particulates. A variety of solvents known in the art may be suitable. Some such solvents include, but are not limited to, acetone, propylene carbonate, dipropylene glycol methyl ether, methylene chloride, isopropyl alcohol, or combinations thereof.

In some embodiments of the present invention, the particulates are coated with from about 0.1% to about 20% orthoester composition by weight of the particulates, more preferably from about 0.5% to about 10% orthoester composition by weight of the particulates, and most preferably from about 1% to about 8% orthoester composition by weight of the particulate material.

In some embodiments, 100% of the particulates are coated with an orthoester composition of the present invention; in other embodiments, only a portion of the particulates may be coated. Where less than 100% of the particulates are coated with an orthoester composition of the present invention, it may be desirable to use a higher concentration of orthoester composition relative to that portion of the particulates to be coated. It is within the ability of one skilled in the art with the benefit of this disclosure to determine the amount of orthoester composition that will be necessary to sufficiently degrade the filter cake and to coat a portion of particulates with enough orthoester composition to achieve that goal.

Where the coated particulates are used in a sand control operation such as gravel packing, the gravel pack may be formed using any technique known in the art. In one technique, gravel particles (at least a portion of which are partially coated with an orthoester composition of the present invention) are slurried into a treatment fluid and pumped into the well bore having a filter cake deposited therein substantially adjacent to the zone of the subterranean formation that has been fitted with a gravel pack screen. In alternative embodiments, it is possible to not use a screen if desired. The gravel particulates are separated from the slurry as the delivery fluid is forced into the well bore through the screen if a screen is used. The gravel particulates are not able to flow through the mesh of the screen and are left behind, forming a gravel pack. The acid generated by the orthoester composition on the particulates then degrades the acid-soluble portion of the adjacent filter cake.

When the coated particulates are used in a fracturing operation, the proppant pack formed inside a fracture from at least some of the coated particulates of the present invention may be formed using any technique known in the art. In one technique, proppant particulates comprising at least some coated particulates of the present invention are slurried into a fracturing fluid and pumped into a subterranean formation at a pressure sufficient to create or enhance a fracture in the formation. At least a portion of those particulates is then placed in a fracture and forms a proppant pack substantially adjacent to the walls of the fracture. The fracturing fluid also forms a filter cake on the surfaces of the fracture. Once the proppant pack is substantially formed, the orthoester composition produces an acid that at least partially degrades the filter cake on the surfaces of the fracture.

Although this invention has been described in terms of some specific uses of the orthoester compositions of the present invention, the orthoester compositions may be used in other applications, for example, to degrade other acid-soluble components in a subterranean formation like the formation itself, calcium carbonate, acid-soluble components of completion equipment such as plugs, or resins (e.g., thermosetting resins).

To facilitate a better understanding of the present invention, the following examples of preferred embodiments are given. In no way should the following examples be read to limit the scope of the invention.

EXAMPLES

Six samples were prepared to illustrate the acid generated by the orthoester compositions and its reaction with calcium carbonate. These six samples are shown in Table 1 and were prepared by the following procedure. In a suitable flask, a quantity of water was added. Then to the flask, a quantity of "WS-44" emulsifier was added. The orthoester composition was then added. This was then stirred for 5 minutes to create an emulsion. While continuing to stir, calcium carbonate was added. A sodium hydroxide solution was added. The mixture was heated to a temperature of 135° F. The $CO_2$ gas generation was then monitored to observe the extent of calcium carbonate dissolution with time. Tables 2 through 7 illustrate these results for each sample.

TABLE 1

Composition of Samples

| Component | Sample 1 | Sample 2 | Sample 3 | Sample 4 | Sample 5 | Sample 6 |
|---|---|---|---|---|---|---|
| Water (ml) | 39 | 37 | 36 | 35 | 34 | 33 |
| Emulsifier (ml) | 1 | 1 | 1 | 1 | 1 | 1 |
| triethylorthoformate (ml) | 20 | 20 | 20 | 20 | 20 | 20 |
| calcium carbonate (g) | 2 | 2 | 2 | 2 | 2 | 2 |
| 0.2 M NaOH (ml) | 0 | 2 | 3 | 4 | 5 | 6 |

TABLE 2

Results for Sample 1

| Time (hr) | $CO_2$ Volume (ml) |
|---|---|
| 0 | 0 |
| 1 | 17 |
| 2 | 46 |
| 4 | 53 |
| 5 | 55.8 |

TABLE 2-continued

Results for Sample 1

| Time (hr) | $CO_2$ Volume (ml) |
|---|---|
| 6 | 58 |
| 7 | 60 |

TABLE 3

Results for Sample 2

| Time (hr) | $CO_2$ Volume (ml) |
|---|---|
| 0 | 0 |
| 1 | 0 |
| 2 | 0 |
| 3 | 0.4 |
| 4 | 1 |
| 5 | 1 |
| 6 | 1.2 |
| 7 | 2 |
| 8 | 22.6 |
| 9 | 50 |
| 10 | 58.5 |
| 23 | 94.5 |

TABLE 4

Results for Sample 3

| Time (hr) | $CO_2$ Volume (ml) |
|---|---|
| 0 | 0 |
| 1 | 0.4 |
| 14 | 0.4 |
| 15 | 33 |
| 16 | 43 |
| 17 | 53.4 |
| 18 | 58 |
| 19 | 61 |
| 21 | 68.8 |
| 22 | 72 |

TABLE 5

Results for Sample 4

| Time (hr) | $CO_2$ Volume (ml) |
|---|---|
| 0 | 0 |
| 1 | 1.2 |
| 2 | 1.2 |
| 3 | 1.8 |
| 5 | 1.8 |
| 6 | 1.8 |
| 7 | 1.8 |
| 8 | 1.8 |
| 23.5 | 1.8 |
| 24 | 46 |
| 25 | 53.8 |
| 26 | 58.5 |
| 27 | 62 |
| 29 | 68 |
| 30 | 71.6 |
| 31 | 75 |
| 32 | 79 |

TABLE 6

Results for Sample 5

| Time (hr) | $CO_2$ Volume (ml) |
|---|---|
| 0 | 0 |
| 1 | 1 |
| 2 | 1 |
| 3 | 1 |
| 5 | 1 |
| 6 | 1 |
| 7 | 1 |
| 21 | 1.2 |
| 22 | 1.2 |
| 23 | 1.2 |
| 24 | 1.2 |
| 25 | 1.2 |
| 27 | 1.2 |
| 28 | 1.2 |
| 29 | 1.2 |
| 30 | 1.2 |
| 34 | 3 |
| 34.5 | 22.2 |

TABLE 7

Results for Sample 6

| Time (hr) | $CO_2$ Volume (ml) |
|---|---|
| 0 | 0 |
| 1 | 0.4 |
| 2 | 0.6 |
| 3 | 0.8 |
| 5 | 1 |
| 6 | 1.6 |
| 7 | 1.6 |
| 8 | 1.6 |
| 24 | 1.6 |
| 25 | 1.6 |
| 26 | 1.6 |
| 27 | 1.6 |
| 29 | 1.6 |
| 30 | 1.6 |
| 31 | 1.6 |
| 48 | 82 |
| 49 | 85.2 |
| 50 | 88.2 |
| 52 | 94 |
| 53 | 97 |

Thus, the present invention is well adapted to carry out the objects and attain the ends and advantages mentioned as well as those, which are inherent therein. While numerous changes may be made by those skilled in the art, such changes are encompassed within the spirit and scope of this invention as defined by the appended claims.

What is claimed is:

1. A method of degrading an acid-soluble portion of a filter cake comprising contacting the acid-soluble portion of the filter cake with an acid generated from an orthoester.

2. The method of claim 1 wherein the orthoester has the general formula RC(OR')(OR'')(OR'''), wherein R', R'', and R''' are not hydrogen, and R', R'', and R''' may or may not be the same group.

3. The method of claim 2 wherein R', '', or R''' comprise a heteroatom.

4. The method of claim 3 wherein the heteroatom is nitrogen or oxygen.

5. The method of claim 1 wherein the orthoester is selected from the group consisting orthoacetates, orthoformates, orthopropionates, and combinations thereof.

6. The method of claim 1 wherein the orthoester comprises an orthoester of a polyfunctional alcohol.

7. The method of claim 1 wherein the orthoester comprises a poly(orthoester).

8. The method of claim 1 wherein the filter cake further comprises a polymeric portion, and wherein a component that is capable of degrading the polymeric portion of the filter cake is used to at least partially degrade the polymeric portion of the filter cake.

9. The method of claim 8 wherein the component capable of degrading the polymeric portion of the filter cake comprises an enzyme or an oxidizer.

10. The method of claim 1 wherein at least a portion of the orthoester is coated or impregnated onto particulates to form coated particulates or impregnated particulates.

11. The method of claim 10 wherein the particulates are selected from the group consisting of natural sand, quartz sand, particulate garnet, glass, ground walnut hulls, polymeric pellets, bauxite, ceramics, and combinations thereof.

12. The method of claim 10 wherein the particulates are in a size range from about 4 to about 100 U.S. mesh.

13. The method of claim 10 wherein the particulates are in a size range from about 10 to about 70 U.S. mesh.

14. The method of claim 10 wherein the orthoester is coated onto the particulates using an on-the-fly method.

15. The method of claim 10 wherein the orthoester is coated onto the particulates in a batch process.

16. The method of claim 10 wherein the coated particulates or impregnated particulates comprise a portion of a fracturing or gravel pack fluid.

17. A method of generating an acid in a subterranean formation comprising the steps of:
providing an orthoester composition that comprises an orthoester;
placing the orthoester composition in the formation; and
allowing the orthoester to generate an acid in the formation.

18. The method of claim 17 wherein the orthoester has the general formula RC(OR')(OR")(OR'"), wherein R', R", and R'" are not hydrogen, and R', ", and R'" may or may not be the same group.

19. The method of claim 18 wherein R', R", or R'" comprise a heteroatom.

20. The method of claim 19 wherein the heteroatom is nitrogen, or oxygen.

21. The method of claim 17 wherein the orthoester is selected from the group consisting of orthoacetates, orthoformates, orthopropionates, and combinations thereof.

22. The method of claim 17 wherein the orthoester comprises an orthoester of a polyfunctional alcohol.

23. The method of claim 17 wherein the orthoester comprises from about 1% to about 100% of the orthoester composition.

24. The method of claim 17 wherein the orthoester composition comprises an inhibitor.

25. The method of claim 24 wherein the inhibitor is selected from the group consisting of sodium hydroxide, potassium hydroxide, sodium carbonate, and combinations thereof.

26. The method of claim 17 wherein at least a portion of the orthoester composition is coated or impregnated onto particulates to form coated particulates or impregnated particulates.

27. The method of claim 26 wherein the coated particulates or impregnated particulates comprise a portion of a fracturing or gravel pack fluid.

28. The method of claim 26 wherein less than 100% of the particulates are coated or impregnated with the orthoester composition.

29. The method of claim 17 wherein the orthoester composition is in a solution form, gel form, or an emulsion form.

30. The method of claim 29 wherein the solution form is selected from the group consisting of propylene glycol, propylene glycol monomethyl ether, dipropylene glycol monomethyl ether, ethylene glycol monobutyl ether, water, and combinations thereof.

31. The method of claim 29 wherein the gel form is selected from the group consisting of polymers, surfactants, and combinations thereof.

32. The method of claim 29 wherein the emulsion form comprises an emulsifier.

33. A method of degrading an acid soluble component in a subterranean formation comprising the steps of:
providing an orthoester composition that comprises an orthoester;
placing the orthoester composition in the formation;
allowing the orthoester to generate a generated acid; and
allowing the generated acid to at least partially degrade the acid soluble component.

34. The method of claim 33 wherein the acid soluble component is a portion of a filter cake.

35. The method of claim 33 wherein the orthoester has the general formula RC(OR')(OR")(OR'"), wherein R', R", and R'" are not hydrogen, and R', R', and R'" may or may not be the same group.

36. The method of claim 35 wherein R', R", or R'" comprise a heteroatom.

37. The method of claim 36 wherein the heteroatom is nitrogen or oxygen.

38. The method of claim 33 wherein the orthoester comprises an orthoester of a polyfunctional alcohol.

39. The method of claim 33 wherein the orthoester composition comprises an inhibitor capable of interacting with the acid so as to delay the degradation of the acid soluble component by the acid.

40. The method of claim 39 wherein the inhibitor is selected from the group consisting of sodium hydroxide, potassium hydroxide, sodium carbonate, and combinations thereof.

41. The method of claim 33 wherein at least a portion of the orthoester composition is coated or impregnated onto particulates to form coated particulates or impregnated particulates.

42. The method of claim 33 wherein the orthoester composition is in a solution form, gel form, or an emulsion form.

43. The method of claim 33 wherein the acid soluble component is a portion of the subterranean formation, calcium carbonate, a thermosetting resin, or a portion of a piece of completion equipment.

44. A method of degrading a filter cake in a subterranean formation comprising the steps of:
providing particulates coated or impregnated with an orthoester composition that comprises an orthoester;
placing the particulates into the subterranean formation so that they are substantially adjacent to the filter cake;
allowing the orthoester to generate a generated acid; and
allowing the generated acid to degrade at least a portion of an acid-soluble portion of the filter cake.

45. The method of claim 44 wherein the orthoester has the general formula RC(OR')(OR'')(OR'''), wherein R', R'', and R''' are not hydrogen, and R', R'', and R''' may or may not be the same group.

46. The method of claim 45 wherein R', R'', or R''' comprise a heteroatom.

47. The method of claim 44 wherein the orthoester comprises an orthoester of a polyfunctional alcohol.

48. The method of claim 44 wherein the orthoester composition comprises an inhibitor that is capable of delaying the degradation of the acid soluble portion of the filter cake by the generated acid.

49. The method of claim 48 wherein the inhibitor is selected from the group consisting of sodium hydroxide, potassium hydroxide, sodium carbonate, and combinations thereof.

50. The method of claim 44 wherein the particulates are selected from the group consisting of natural sand, quartz sand, particulate garnet, glass, ground walnut hulls, polymeric pellets, bauxite, ceramics, and combinations thereof.

* * * * *